April 1, 1924.
F. W. PARSONS
1,488,796
PISTON AND CONNECTING ROD CONSTRUCTION
Filed Sept. 18, 1922
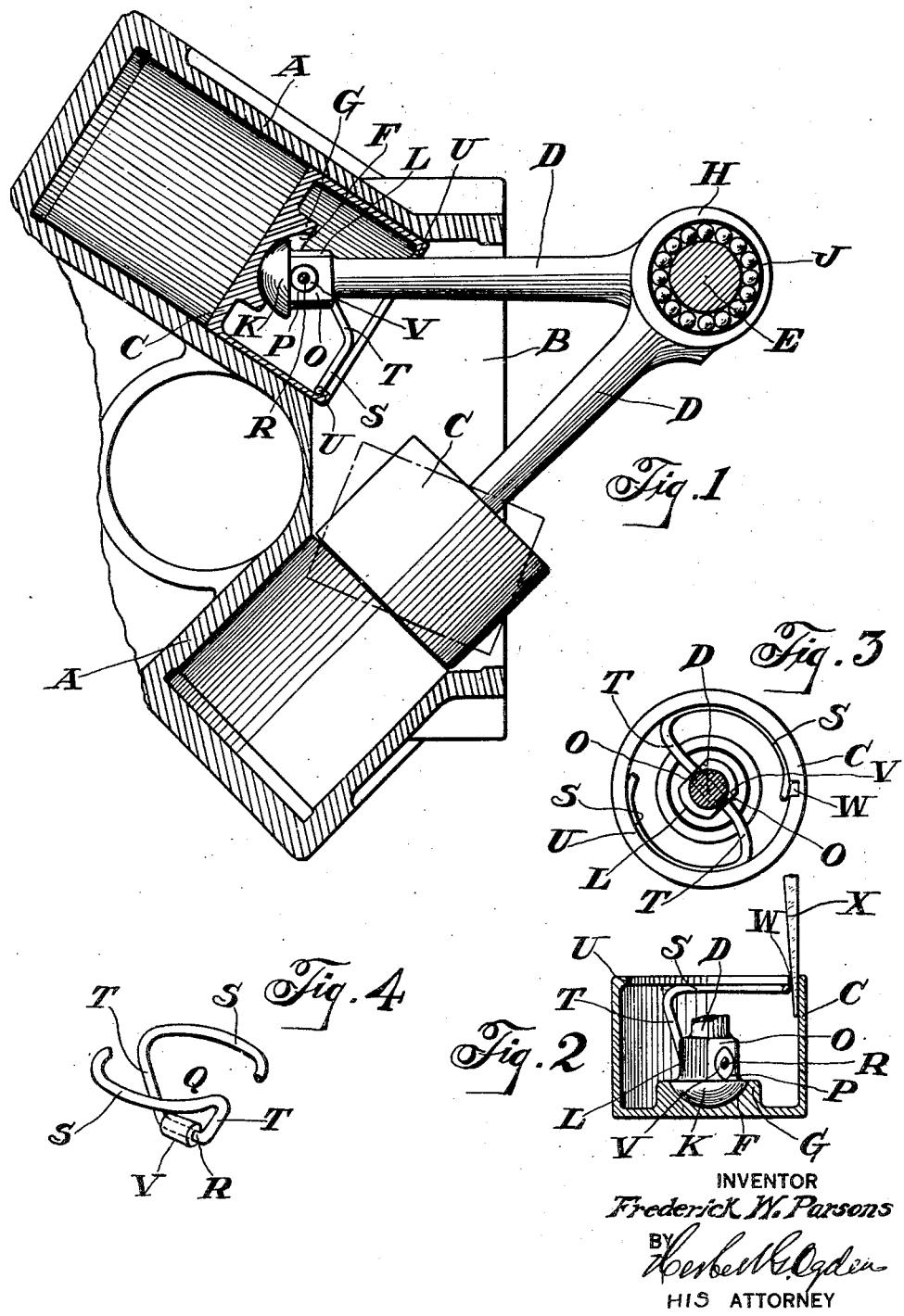
INVENTOR
Frederick W. Parsons
BY Herbert G. Ogden
HIS ATTORNEY Patented Apr. 1, 1924.

1,488,796

UNITED STATES PATENT OFFICE.

FREDERICK W. PARSONS, OF ELMIRA, NEW YORK, ASSIGNOR TO INGERSOLL-RAND COMPANY, OF JERSEY CITY, NEW JERSEY, A CORPORATION OF NEW JERSEY.

PISTON AND CONNECTING-ROD CONSTRUCTION.

Application filed September 18, 1922. Serial No. 588,917.

*To all whom it may concern:*

Be it known that I, FREDERICK W. PARSONS, a citizen of the United States, and a resident of Elmira, county of Chemung, State of New York, have invented a certain Piston and Connecting-Rod Construction, of which the following is a specification, accompanied by drawings.

This invention relates to engines of the type adapted to be operated by fluid under pressure, as compressed air, for high speed rotating tools or machines, and more particularly to the construction of the piston and connecting rod in such engines. In engines of this type the connections between the piston and connecting rod must be simple in character and positive in operation, and the restriction of the space usually available for effecting the required connections presents difficulties in assembling the pistons, connecting rods and other parts in the engine. As a result it is frequently necessary to form the crank shaft, connecting rods and pistons as a single unit to be inserted in the cylinders.

One object of my invention is to permit the ready assembly and disassembly of the piston and connecting rod, regardless of whether the moving parts of the engine are inserted as a unit or the connection of the pistons and connecting rods is effected within the cylinders, through the use of a simply constructed and positively acting retaining member or device.

Another object is to construct the retaining member in the form of a spring bent and retained so that it may be easily displaced and removed to disconnect the parts when desired. A still further object is to simplify and improve the construction of the piston by employing a portion of the retainer as a pivotal support for the end of the connecting rod as well as for the purpose of connecting the piston and connecting rod together.

Still further objects will later appear, and to all these ends I have devised the piston and connecting rod construction shown in the accompanying drawings, in which—

Figure 1 is a side view partly in longitudinal section through two opposed cylinders of a fluid pressure operated rotary engine but transverse to the axis of the crank shaft, showing the retainer in operative position.

Figure 2 is a detail longitudinal sectional view through one of the pistons illustrating the manner of removing or dislodging the retainer.

Figure 3 is an end view of the inner portion of one piston with the connecting rod in transverse section, showing the retainer in place, and Figure 4 is a perspective view of the retainer proper.

Referring to the drawings, the cylinders A are arranged in opposed relation in the casing B and suitable pistons C are adapted to operate within the cylinders A. Connecting rods D are adapted to be connected to the pistons in the manner herein set forth and these connecting rods D are suitably secured on the crank shaft E. The pistons C are hollow, and sockets F are formed in the rearwardly extending integral portions G of the piston heads.

The crank ends of the connecting rods D are formed with continuous rings H adapted to be slipped over the bearing sleeves J and hemi-spherical bearing portions K are formed on the piston ends of the rods D, the convex portions K fitting the sockets F. Enlarged portions L are formed on the connecting rods D adjacent to the bearing portions K, these portions L having flat opposite longitudinal surfaces O, and holes P extend transversely through the portions L meeting the surfaces O. The retainer Q consists of an angularly bent spring formed of wire of considerable stiffness and includes a straight portion R passing through the holes P and providing a pivotal support for the connecting rods, and opposite semicircular parallel arms S adapted to conform to the hollow interior of the piston C. The arms S are joined to the straight portion R by portions T formed in gradual and easy bends so that the straight portions R, the portions T and the arms S may be slipped out of the holes P when desired.

In connecting the piston and connecting rod the retainer Q is first positioned on the connecting rod with the straight portion R within the hole P and the connecting rod is forced into the hollow piston, the arms S sliding past the inwardly directed circular rim U formed on the inner side of the piston and coming to rest within the rim U and being held therein, thus securing the piston and connecting rod in position with the retainer engaging the connecting rod and piston at separated points. If desired the holes P may be enlarged to accommodate a sleeve V which may be placed over the straight portion R. The use of the sleeve V is optional but it serves to provide a satisfactory and substantial pivotal point. When the sleeve V is used it is usually placed at the center of the piece of wire which is to form the retainer before the portions S and T are bent, so that the sleeve V is held against accidental removal from the retainer Q and is removable from the hole P with the retainer proper. The rim U may have one or more notches or openings W in its inner edge for the insertion of a suitable pointed tool X to facilitate the removal or dislodgment of the retainer and separation of the connecting rod and piston as shown in Figure 2.

In the construction shown the connecting rods may be connected to the pistons after the pistons have been placed in the cylinders as above described, or the moving parts of the engine may first be connected and assembled as a unit. In the latter case the pistons are tilted as shown in dotted lines in Figure 1 so that they are accurately aligned with the cylinders, the angle of the cylinders with respect to each other being such as to permit such insertion and the width of the hollow interior of the pistons being sufficient to permit the proper angle of inclination necessary in properly aligning the pistons with the cylinders.

I claim as my invention:

1. A piston and connecting rod construction comprising a piston, a connecting rod, and a spring retainer passing through the end of said connecting rod and held within said piston for removably connecting said piston and connecting rod.

2. A piston and connecting rod construction comprising a hollow piston having an interior socket, a connecting rod and a spring retainer having a straight portion affording a pivotal support for the connecting rod and opposite spring arms serving to secure said piston and connecting rod together.

3. A piston and connecting rod construction comprising a hollow piston having an interior socket, a connecting rod and a spring retainer passing through the end of said connecting rod, and held within said piston to afford a pivotal support for removably securing said connecting rod within said socket and said piston and connecting rod together.

4. A piston and connecting rod construction comprising a hollow piston, a connecting rod and an angularly bent spring retainer having a straight portion and opposite spring arms retained within said piston for removably securing said piston and connecting rod together.

5. A piston and connecting rod construction comprising a hollow piston having an interior socket, a connecting rod and a spring retainer passing through said connecting rod for pivotally supporting said connecting rod in said socket, said retainer having opposite spring arms held within said piston for removably securing said piston and connecting rod together.

6. A retainer for removably securing a piston and connecting rod together, comprising a spring having a straight portion providing a pivot for the connecting rod, the ends of said spring terminating in arms held within the rim of the piston.

7. A retainer for removably securing a piston and connecting rod together, comprising a wire bent to include a straight portion providing a pivotal support for the connecting rod, opposite semi-circular arms conforming to the recess within the rim of the piston, said arms joining said straight portion in gradual bends permitting the easy removal of said retainer from the connecting rod.

In testimony whereof I have signed this specification.

FREDERICK W. PARSONS.